United States Patent Office 2,822,185
Patented Feb. 4, 1958

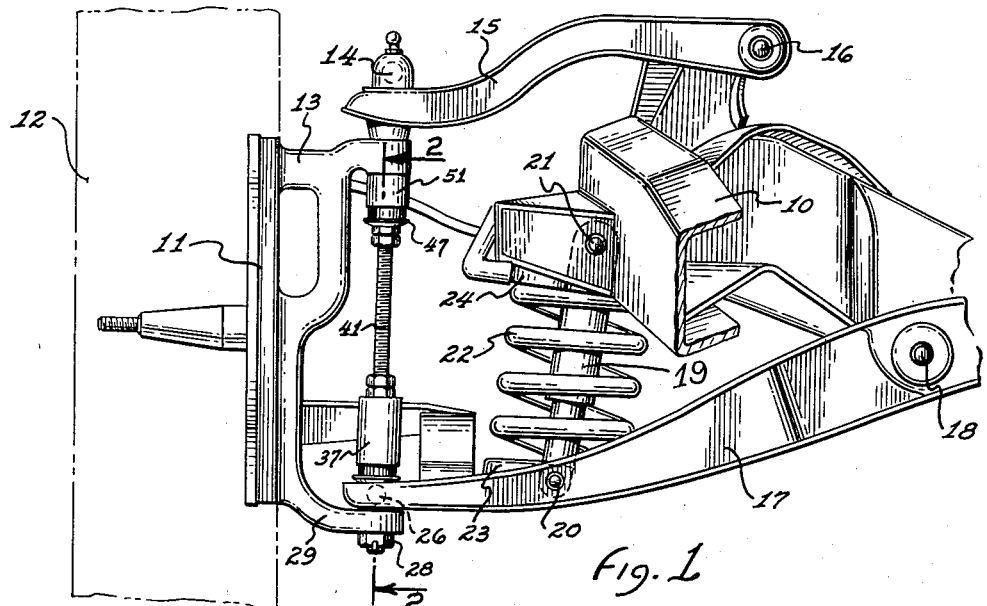
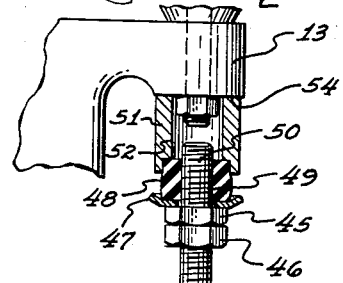
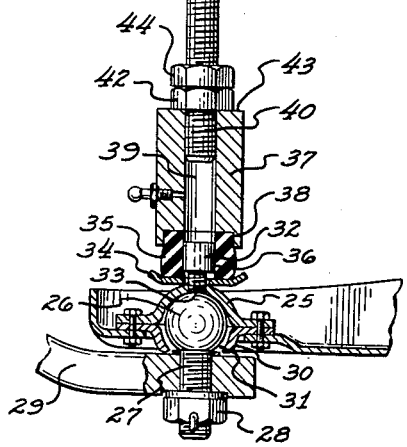

2,822,185

STABILIZER FOR AUTOMOTIVE FRONT END SUSPENSIONS

Fred Mineck, Phoenix, Ariz.

Application March 15, 1956, Serial No. 571,791

3 Claims. (Cl. 280—96.2)

This invention pertains to improvements in stabilizer apparatus for automotive front end suspensions and is particularly directed to an improved stabilizer arrangement for ball joint knee action front end suspension for motor vehicles.

In recent years in automotive practice it has been common to utilize a ball joint front end suspension in which the lower ball had a clearance or looseness of engagement with the socket on the lower fork of the suspension apparatus and in which the spring pressure and weight of the car were relied upon to maintain the inner engagement firmly of the lower ball joint of the mechanism. It has been found, however, in practice that on very rough roads and extremely high speed driving that the spring due to the weight and mass of the parts and the functioning of the shock absorber cannot maintain this constant engagement of the loose lower ball joint connection. As a result, steering misalignments, rattles and vibration occur under certain severe operating conditions resulting in a car or automotive vehicle of poor roadability and a tendency to wander and fight the steering thereof. It has also resulted in uneven tire wear and uneven braking.

The object of the present invention is to provide a simple device critically positioned in the front end suspension system of the type above noted with a loose lower ball in such a way as to maintain positive firm contact at all times at the lower ball joint for any type of driving condition.

Still another object of this invention is to provide an improved stabilizer for the ball joint front suspension which may be installed with a minimum of effort and expense but which effects a great improvement in roadability, driving and performance of the front end suspension under all types of road conditions.

Still another object of this invention is to provide an improved front end stabilizer for motor vehicle having a loose lower ball joint connection which is positioned between the upper ball joint of the front wheel spindle casting and the lower yoke of the knee action front suspension so as to maintain positive and firm alignment at all times of the lower ball joint for any type of road conditions.

Further features and advantages of this invention will appear from a detailed description of the drawings in which:

Fig. 1 is an enlarged fragmentary front elevation of a portion of one front wheel assembly suspension system incorporating the features of this invention.

Fig. 2 is a section on the line 2—2 of Fig. 1.

In Fig. 1 is shown a motor vehicle having the chassis frame 10 and the front wheel spindle casting or forging 11 carrying the usual road wheel 12 in a well known manner. The upper portion of the forging 11 has the arm 13 carrying the ball joint 14 which is supported on the outer end of the upper yoke 15 which in turn is pivotally mounted at its rear end at 16 to the chassis frame 10 of the vehicle. The lower yoke 17 is pivotally mounted at 18 on the chassis frame 10 and is connected by a shock absorber 19 pivotally connected at 20 on the lower yoke 10 and pivotally connected at its upper end 21 to the chassis frame 10. The load carrying coil spring 22 rests in a suitable socket 23 of the lower yoke 17 and in a suitable socket 24 on the frame 10 so as to normally carry the load on the frame 10 of the vehicle on the lower yoke 17.

The outer end of the lower yoke 17 carries a ball socket comprising the upper piece 25 which fits down normally on the ball 26 having the stem 27 secured by the nut and washer 28 to the lower arm 29 of the front wheel spindle forging 11. A lower ball socket piece 30 fits with a clearance space 31 relative to the ball 26 so that the ball may move up and down vertically or sidewise relatively in the socket 25—30, the spring 22 serving under ordinary conditions to hold the upper ball socket piece 25 in engagement with the ball 26.

Unfortunately, on very rough roads and with strong side thrusts the ball 26 tends to ride out and up and down relative to the upper ball socket piece 25 resulting in misalignment of the linkage system of the front end suspension and the resulting bad steering, roadability and tire wear of the automobile. Very rough roads also cause rapid oscillatory relative movement between the ball 26 and the parts 25—30 resulting in rattle and annoying vibration in the vehicle especially at high speeds on rough roads. Also the pounding action and relative great movement between the ball 26 and the parts 25—30 cause rapid wear and peening out of the bearing seats resulting in misalignment and continuously greater noise and defective operation of the front end suspension. It also lends itself to easy access of dust and dirt between the ball 26 and the spherical surfaces on 25—30 which further aggravates the rapid wear and increased misalignment of the arrangement.

It is applicant's object to provide means to hold the member 25 firmly down against the ball 26 independent of any forces relatively provided by the spring 22 so that any rapid oscillation of the road wheel 12 and the spindle forging 11 cannot cause relative movement between the ball 26 and the member 25 under any operating conditions.

To this end there is provided a plug 32 having a reduced threaded end 33 which is screwed into the normal grease cup hole in the crown of the member 25 and around which is fitted a washer 34 which receives and supports the resilient composition collar 35 which fits nicely around the diameter 36 of the plug 32. Fitting around the upper edge of the composition collar 35 is the bushing 37 having a counter bore 38 to nicely receive the upper end portion of the composition collar 35. A central bore 39 is formed in the bushing 37 and receives the lower end 40 of a threaded stud 41 upon which are mounted the thrust nut 42 engaging the top surface 43 of the bushing 37 and held in place by the jam nut 44. On the upper portion of the threaded stud 41 is the thrust nut 45 secured in place by the jam nut 46, the thrust nut supporting a washer 47 which in turn supports the composition resilient collar 48. This collar 48 has a suitable bore 49 nicely surrounding the upper end 50 of the threaded stud 41. A collar 51 has a suitable counter bore 52 which nicely fits over the upper end of the resilient collar 48. The upper abutment surface 53 of the collar 51 engages the surface 54 of the upper arm 13 of the front wheel spindle forging 11.

Thus, with the vehicle in normal position on the road surface the nuts 45—46 and 42—44 may be moved on the threaded stud 41 sufficiently closely together to allow the assembly to be placed as shown in Fig. 2 and then the thrust nuts 42 and 45 are rotated to move them apart to take up the proper pressure against the resilient composition collars 35—48. Thus, pressure is exerted in a resilient damped manner between the abutment surface 54 on the upper arm of the front wheel spindle forging 11 and downwardly against the upper piece 25 of the ball socket so as to hold it firmly at all times against the ball 26 independent of inertia movements or vibrations of the lower yoke 17 or the restrictive movements imposed by the shock absorber 19. Thus, at all times the ball 26 is firmly in the socket 25 for maintaining perfect alignment and rattle-free engagement of these respective parts under all road operating conditions.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A stabilizer for an automotive front end suspension having, a chassis frame, a front wheel spindle member, an upper yoke pivotally mounted at its inner end on said frame, a ball joint connection above said spindle member located between the underside of the outer end of said upper yoke and the upper end of said spindle member, a lower yoke pivotally mounted at its inner end on said frame below the inner end of said upper yoke, a loose ball joint connection located between the underside of the outer end of said lower yoke and the upper side of the lower end of said spindle member, a compression load carrying spring between said frame and said lower yoke arranged to normally urge the underside of the outer end of said lower yoke toward the upper side of the lower end of said spindle member, a shock absorber connected between said frame and said lower yoke to restrain relative free swinging movement of said lower yoke on said frame, and means supported on said spindle member and said lower yoke to exert a resilient downward force between the upper end of said spindle member and the outer end of said lower yoke in a direction substantially parallel to a line passing through said ball joints to normally hold the outer end of said lower yoke and ball joint against the upper side of the lower end of said spindle member.

2. A stabilizer for an automotive front end as set forth in claim 1 wherein said means supported on said spindle member and said lower yoke exerts a resilient downward force between the upper end of said spindle member and said lower yoke in a direction substantially parallel to the direction of downward force of said load carrying spring.

3. A stabilizer for an automotive front end suspension having, a chassis frame, a front wheel spindle member, an upper yoke pivotally mounted at its inner end on said frame, a ball joint connection between the outer end of said upper yoke and the upper end of said spindle member, a lower yoke pivotally mounted at its inner end on said frame below the inner end of said upper yoke, a loose ball joint connection between the outer end of said lower yoke and the lower end of said spindle member, a compression load carrying spring between said frame and said lower yoke, a shock absorber between said frame and said lower yoke, and means to exert a resilient downward force between the upper end of said spindle member and said lower yoke in a direction substantially to a line passing through said ball joints, said means including a plug rigidly secured adjacent the ball joint socket on the outer end of said lower yoke, a lower bushing, a resilient collar between the outer end of said lower yoke and said bushing and receiving said plug, an upper bushing engaging the upper end of said spindle member immediately below said upper ball joint, a resilient collar below and engaging said upper bushing, and a threaded stud having jam nuts thereon adjustable to exert downward pressure through said bushings and resilient collars on the outer end of said lower yoke.

References Cited in the file of this patent

UNITED STATES PATENTS

| | | |
|---|---|---|
| 2,208,325 | Krutsch | July 16, 1940 |
| 2,290,923 | Wahlberg | July 28, 1942 |
| 2,507,108 | Lange | May 9, 1950 |
| 2,521,335 | Booth | Sept. 5, 1950 |
| 2,621,919 | Utz | Dec. 16, 1952 |